US006957780B2

(12) United States Patent
Rosa

(10) Patent No.: US 6,957,780 B2
(45) Date of Patent: Oct. 25, 2005

(54) FLUID APPLICATION SYSTEM FOR A VEHICLE

(76) Inventor: Andy Rosa, 2219 Perlwinkle La., Naperville, IL (US) 60540

(*) Notice: Subject to any disclaimer, the term of this patent is extended or adjusted under 35 U.S.C. 154(b) by 499 days.

(21) Appl. No.: 10/061,758

(22) Filed: Feb. 1, 2002

(65) Prior Publication Data

US 2003/0148029 A1 Aug. 7, 2003

(51) Int. Cl.[7] ................................................ A01G 27/00

(52) U.S. Cl. .............................. 239/67; 239/68; 239/69

(58) Field of Search ................................ 239/67–70, 1, 239/8, 10–11, 99, 722, 726, 237, 240–243, 255, 263, 263.1; 134/18, 56 R, 57 R, 123, 180, 181

(56) References Cited

U.S. PATENT DOCUMENTS 5,447,574 A * 9/1995 Inoue .......................... 134/18
6,364,352 B1 * 4/2002 Norton ....................... 280/735

* cited by examiner

*Primary Examiner*—David A. Scherbel
*Assistant Examiner*—Thach H Bui

(57) ABSTRACT

A fluid application system for a truck with a truck bed. The system includes a fluid source, a pump, and a spray unit with a nozzle. A sensor is also provided to output a vehicle detection signal including a vehicle profile signal. A controller is adapted to receive the vehicle detection signal, activate the pump to deliver the fluid to the spray unit in response to the vehicle profile signal when the profile signal indicates a first end of the material container portion, such as the start of the truck bed. The controller turns off the pump when the end of the material container portion of the vehicle is detected, or a pump timer expires.

25 Claims, 2 Drawing Sheets

FLUID APPLICATION SYSTEM FOR A VEHICLE

CROSS-REFERENCE TO RELATED APPLICATION

This application is related to co-pending U.S. application Ser. No. 10/039,889, filed on Oct. 19, 2001 and entitled "Fluid Application System And Method" which is herein incorporated by reference.

TECHNICAL FIELD

The present invention relates to a fluid application system and method, and more particularly concerns a method and system for the automatic application of a fluid mixture to the bed of transportation vehicles.

BACKGROUND

The process of paving roads, runways, parking areas and the like with asphaltic concrete (asphalt) involves the transportation of the asphalt from the manufacturing plant to the paving site. Numerous types of vehicles are employed to transport asphalt from the manufacturing plant to the paving site. These vehicles include tandem dump trucks, tri-axle dump trucks, dump trailers, live-bottom trailers, hopper trailers, center drop trailers, double trailers, and the like. The asphalt transported by these vehicles is received "hot" so that it is in a workable condition at the paving site. To prevent the asphalt from sticking or adhering to the bed of the transportation vehicle, a lubricating type material commonly known as asphalt release agent is applied to the truck bed prior to loading the asphalt.

The most common form of release agents are liquids which are sprayed or splashed or otherwise applied to the vehicle truck beds. One common method of spraying the truck bed with release agent is by the use of a pump-up sprayer. In such applications, a measure of release agent is placed into the tank of the pumping unit, diluted as required (typically with water), agitated, sealed and then pressurized by a pump to a sufficient air pressure to spray the bed of the truck. The spraying is conducted by the vehicle operator or personnel at the asphalt plant controlling a wand or a nozzle to direct the flow of the spray unit. This method is somewhat ineffective in that the sprayers generally do not spray uniformally, and have decreasing air pressure while they are being used. Additionally, this method may require the vehicle operator or other personnel to climb up onto the truck bed, presenting obvious safety hazards.

Other conventional spray units operate in cooperation with a stand built to allow the driver or other personnel to be at truck bed level while applying the release agent. Spray units of this type may employ a pump or venturi (using water pressure, air pressure or both) to dilute the release agent and supply the necessary pressure to spray the diluted release agent through an appropriate nozzle. Such units also have numerous drawbacks, including the lack of control over the release agent concentration due to variability of water and/or air pressure, lack of uniformity of application, and time and safety risks associated with driver or personnel involvement in the application of the release agent.

Other pump type asphalt release agent applicators are available which require that the release agent be used neat or pre-diluted. The use of neat release agents is very expensive due to increased freight and handling costs. For example, to provide diluted release agent at a manufacturing site requires additional equipment both for transfer of the concentrate and the mixing process. Furthermore, the uniformity of the resulting mixture is often unsatisfactory.

Accordingly, there is a need for a system and method of applying release agent to the bed of transportation vehicles which does not require an operator to leave the vehicle, which recognizes the type of vehicle to which the agent is to be applied, which controls the amount and concentration of the release agent used, and effectively and efficiently sprays the bed of the vehicle.

SUMMARY OF THE INVENTION

The present invention provides a new and improved fluid application system and method. In one embodiment, a fluid application system for vehicle is provided. The system includes a fluid application system for a vehicle having a material container portion such as a truck with a truck bed. The system is particularly suited for spray boom applications of fluid to a truck bed wherein the truck is driven under the spray boom. The system includes a fluid source, a pump in fluid communication with the fluid source, and a spray unit including a nozzle in fluid communication with the pump. A sensor is also provided to output a vehicle detection signal including a vehicle profile signal. A controller in operative communication with the sensor and the pump is adapted to receive the vehicle detection signal, activate the pump to deliver the fluid to the spray unit in response to the vehicle profile signal when the profile signal indicates a first end of the material container portion, such as the start of the truck bed. The controller turns off the pump when the end of the material container portion of the vehicle is detected, or a pump timer expires.

In another aspect of the invention, a vehicle identification signal is provided to the controller, and the controller is adapted to determine a ratio of first and second fluid sources for application of a fluid mixture to the material container portion of a vehicle in response to the vehicle identification signal. For example, the vehicle identification signal is used to indicate the type of material to be loaded into the vehicle material container and, hence, the appropriate concentration ratio of fluid mixture to be applied to the material container before receipt of the material to be loaded.

Various sensors and input devices are used to provide the vehicle detection signal, vehicle identification signal, and vehicle profile signal. In one embodiment, the vehicle profile signal is generated by a distance-based sensor located above the vehicle to be sprayed to provide an indication of the location of the material container portion of the vehicle as well as the loaded/unloaded or tarped/untarped status of the material container portion.

A method for applying a fluid mixture to a vehicle having a material container portion is also disclosed. The method includes receiving a vehicle detection signal from a first sensor indicating a vehicle proximate the spray unit and receiving a vehicle identification signal indicative of a corresponding fluid mixture ratio to be applied to the material container. A vehicle profile signal is also processed to locate a first end of the material container portion with respect to the spray unit. A control valve in communication with a fluid source is set to provide the corresponding fluid mixture ratio, and a pump is activated to deliver the corresponding fluid mixture to the spray unit in response to locating the first end of the material container. The pump is turned off in response to locating a second end of the material container, or upon a pump timer expiration. The characteristics of the type of material to be loaded into the material container portion of the vehicle can also be received to set the appropriate fluid concentration ratio.

One advantage of the present invention is that it provides an automatic system for applying release agent to the bed of a transportation vehicle. Another advantage is that it controls the concentration of the release agent applied to the vehicle truck bed. Another advantage of the present invention is that it effectively and efficiently applies release agent to the bed of a vehicle.

Other advantages and features of the present invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION OF THE INVENTION

While the present invention is described with respect to a method and apparatus for automatically spraying a release agent mixture to the bed of an asphalt transportation vehicle, the present invention may be adapted to be used in other vehicle spray systems such as applying release agent mixtures to concrete transportation vehicles. Further, in the following description, various operating parameters and components are described for one constructed embodiment. The specific parameters and components are included as examples and are not meant to be limiting. Also, terms such as "vehicle bed" and "release agent" are not meant to be limiting. Thus, "vehicle bed" includes that portion of a vehicle used to haul the material under consideration and includes the entire box unless only a portion of the box is referred to such as the sides or floor. Similarly, "release agent" is used in the example of the disclosed embodiment to represent any fluid concentrate to be mixed with a carrier fluid. The spray system can operate equally as well, however, with pre-mixed or "neat" solutions.

Figure 1:
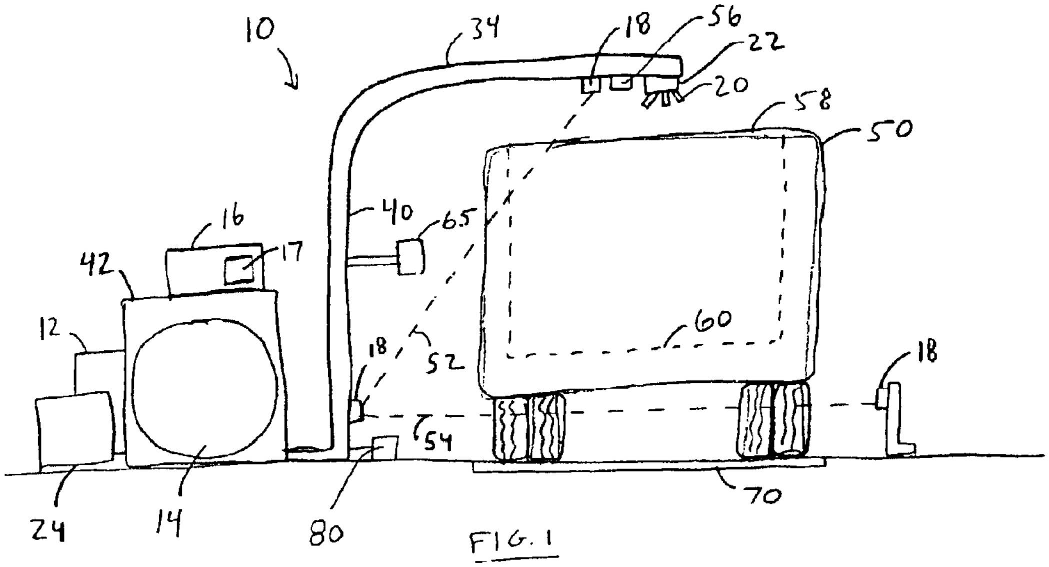
FIG. 1 is a side view of an automatic fluid application system according to one embodiment of the present invention.
Figure 2:
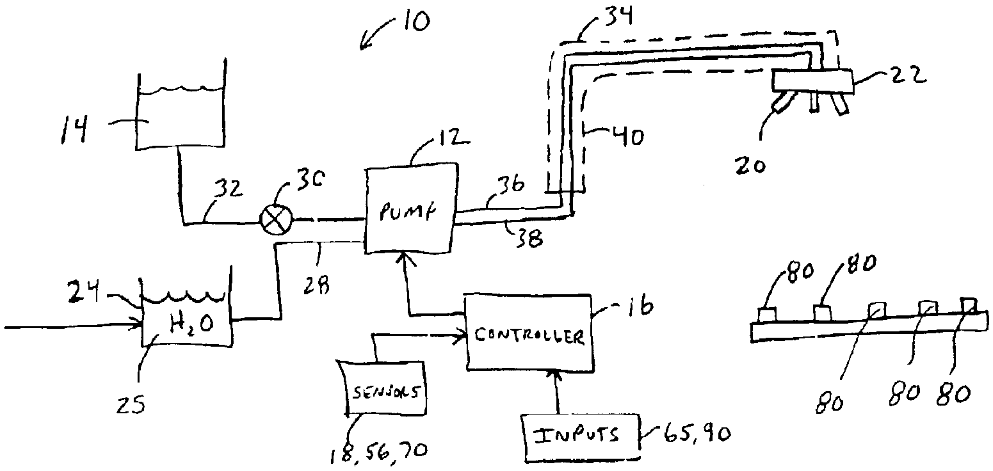
FIG. 2 is a schematic block diagram of the automatic fluid application system of FIG. 1.

Referring now to FIG. 1 there is shown a side view of an automatic fluid application system according to one embodiment of the present invention. FIG. 2 shows a schematic block diagram of the automatic fluid application system of FIG. 1. The system 10 includes a pump 12, a release agent reservoir 14, a controller 16, sensors 18, and spray unit 34 including a boom 40 having applicators such as nozzles 20 carried on manifold 22. The pump 12 is in fluid communication with a second fluid source 24 such as a water supply for mixing with the release agent concentrate in reservoir 14. The water supply 24 may include a reservoir 25 to act as a buffer to ensure an adequate water supply to pump 12 during spraying applications. Reservoirs 14 and 25 may be a drum, an intermediate bulk container or a storage tank, for example.

The pump unit 12 is a centrifugal pump, a gear pump, a diaphragm pump, a plunger pump, a piston type pump, or the like suitable for the particular application under consideration. The pump may be operated by an electric motor, fuel engine, air pressure or hydraulic system. Auxiliary components such as valves and conduits to receive the release agent from reservoir 14 and mixing fluid from supply 24 or reservoir 25 are also included.

One example of pump 12 is a pump capable of producing a pressure between 200 psi and 3,000 psi for a flow rate of between approximately 4 gallons per minute and 12 gallons per minute. In another example, pump 12 is a piston type pump producing 800 psi of pressure and a flow rate of 8 gallons per minute. In applications where the pump 12 is delivering only a single fluid, i.e. a pre-mixed release agent, to the nozzles 20, the conduit 28 to the second fluid supply 24 would not be necessary.

In applications where the pump 12 is mixing two fluids, one from reservoir 14 and another from source 24 to achieve a desired dilution ratio, a selectable metering valve 30 is included in the conduit 32 between the pump and the fluid to be mixed such as concentrated release agent in reservoir 14. Valve 30 can be a programmable two-way valve capable of operating at one of two flow rates depending upon the desired dilution ratio of the release agent. Valve 30 can also be a variable flow control valve capable of operating at any desired flow rate in response to a control signal from controller 16. Valve 30 can also be a manually operated valve for providing a selectable dilution ratio for the first and second fluids.

In some applications wherein high fluid pressure is not required, the pump 12 can be replaced by a control valve. The control valve, under the control of the controller, would turn on and off the flow from the respective first and second fluid reservoirs for delivery to the spray unit. The metering valve 30 in-line in conduit 32 could still be included to control the dilution ratio of the two fluid sources.

The spray unit 34 includes appropriate piping or conduits to convey the fluid mixture from the pump 12 to the manifold 22 and nozzles 20. In one embodiment, the pump 12 conveys fluid to the manifold 22 by high-pressure hoses 36, 38. Each hose 36, 38 carries a release agent mixture of differing dilution ratios. Thus, when two-way valve 30 is in a first position, conduit 36 conveys the resulting fluid mixture to the nozzles; and when valve 30 is in a second position, conduit 38 conveys the resulting fluid mixture to the nozzles. In this way, it is ensured that each vehicle bed receives the proper concentration of diluted release agent and does not receive the release agent mixture applied to the prior vehicle which would otherwise be remaining in the conduit between the pump and the nozzle. Additional conduits could be included in a similar manner to coincide with the range of dilution ratios available.

The spray unit 34 includes an arch or boom 40 which may be a pipe of 2.5 to 8.0 inches in diameter and constructed of plastic, aluminum, steel or stainless steel. In one embodiment, the boom 40 is a steel pipe 3.5 inches in diameter and 21 feet in length, bent approximately 90° such that the clearance between the end of the pipe supporting the manifold 22 and the ground is approximately 13 feet. Of course, numerous other arch configurations can be constructed to accommodate the vehicles intended for the fluid application. Thus, the boom 40 could also be in an arch configuration or an H-configuration or a boom configuration of less than 90° extending from the support structure 42 of the system.

Two or more vehicles can be accommodated at the same time by duplicating several system components in a parallel vehicle receiving station. These would include an additional spray unit 34 and sensors 18 as well as another control valve 30 to separately meter the dilution ratio of the fluid applied to the second vehicle.

Referring to FIG. 2, a plurality of guiding lights 80 are positioned parallel to the direction of travel of the vehicle to pace the vehicle operator through the sprayer system. In one embodiment, guiding lights are located at distances of 8, 16, 20, 24, and 32 feet from the spray unit and are activated sequentially to pace the vehicle under the spray unit. In this way, the vehicle operator need only maintain the driver door approximately aligned with the activated guiding light to ensure a substantially even and thorough coating of the vehicle bed.

In another example of the fluid application system, the pump 12, first fluid reservoir 14, controller 16 and spray unit 34 are all attached to support structure 42 such that the entirety of the system 10 can be readily moved to any location at the asphalt manufacturing plant. The portable structure includes external connections to operate the components carried thereon such as connections for water, electricity, and/or air.

The spray unit 34, at one end, supports the manifold 22 and nozzles 20. Although a single nozzle may be sufficient for some applications, a plurality of nozzles is preferred. In the example shown in FIGS. 1 and 2, three nozzles 20 are provided. Each nozzle may be of various designs to provide a desired spray pattern for delivering the fluid to coat the bed of a vehicle without producing wasteful mist or overspray. The spray patterns may include flat or cone-shaped spray or streams depending upon the spray angle of the nozzle. The nozzle 20 may also be angled with respect to the manifold 22. As shown in FIGS. 1 and 2, two nozzles are angled with respect to the manifold 22 and one is pointed straight down towards the vehicle bed 50. The nozzles may be fixed, rotary-type or oscillating. One example of a nozzle is a rotating nozzle of approximately 0.035 to 0.090 inches, with a preferred opening of 0.065 inches, and a zero degree spray pattern. In a multi-nozzle arrangement such as shown in FIGS. 1 and 2, three nozzles may be provided spaced approximately one inch from each other with the middle nozzle 90° to the manifold surface and the outer nozzles approximately 65° to the manifold surface such that the spray pattern of the outer nozzles is directed away from that of the middle nozzle.

The sensors 18 include vehicle detection devices to detect the presence of a vehicle and/or the type of vehicle approaching the spray unit 34. In one embodiment, the sensors 18 are light sensors which use light (laser, ultra violet, visible, or infra red) to detect the presence of a vehicle. Such sensors may be "electronic eye"-type sensors wherein a transmitting and receiving unit is employed to monitor whether a light path such as path 52 or path 54 is broken (interrupted) by the presence of a vehicle. Sensor 18 can also be a proximity type sensor, including an ultrasound or full-distance sensor. In another embodiment, the sensing device may include a distance sensor 56 to detect the presence and profile of the vehicle bed 50. One example of a distance sensor is a proximity sensor. In this way, distance sensor 56 can be used to distinguish between the top 58 of the vehicle 50 and the bed floor 60 of the vehicle 50 to activate the spray unit 34 as described in more detail below. Distance sensor 56 may include an ultrasonic sensor, radar sensor, laser sensor, or the like. An additional or alternate sensor for vehicle identification is platform scale 70. By way of the scale 70, vehicles can be classified by weight and vehicle position can also be determined.

Input device 65 may also be included for additional or alternate vehicle identification. Input device 65 include sensors such things as radio tag and bar code readers to inform the controller 16 of the type of vehicle 50 present under the spray unit 34. Input device 65 could also be a credit card-type reader which allows the operator to "swipe" an identification card. An additional or alternate input device can include a communications link 90 for receiving data from a central system controller or other on-site or off-site system such as the asphalt silos. Other systems from which data may be received via communications link 90 include truck loading, ticketing or dispatch systems. The communications link can be of the following types: serial, Ethernet, wireless, shared memory, or any other known communications method.

The controller 16 is in operative communication with the sensors 18, 56, 70, inputs 65, 90, valve 30, and pump unit 12 for detecting the presence of a vehicle 50 and activating the pump 12 to drive the spray unit 34 to apply fluid to the vehicle bed. The controller 16 includes an operator interface panel 17 for inputting vehicle information and/or displaying system information. The interface panel may be fixed or detachable. One example of a detachable interface panel is a laptop computer connected to said controller 16. The controller may be a microprocessor-based device such as a computer having associated memory (RAM and/or ROM), inputs, outputs and a communications bus. In one embodiment, controller 16 is a programmable logic controller (PLC) adapted to receive a plurality of inputs such as from sensors 18, 56, reservoirs 14, 25, and pump 12; and control a plurality of outputs such as to pump 12, sensors 18, 56, and metering valve 30 in accordance with a program. In another aspect, interface panel 17 is electromechanical and includes buttons, switches, lights, displays, counters, timers and the like, as dictated by the system functionality and complexity.

In operation, the automatic fluid application system is activated upon the detection of a vehicle under the spray unit. Upon detecting the presence and/or profile of a vehicle from the sensor inputs, the system activates the pump unit as a function of time and/or the vehicle profile to apply the desired concentration ratio of release agent to the vehicle bed, and resets the system in preparation for the next vehicle.

Figure 3:
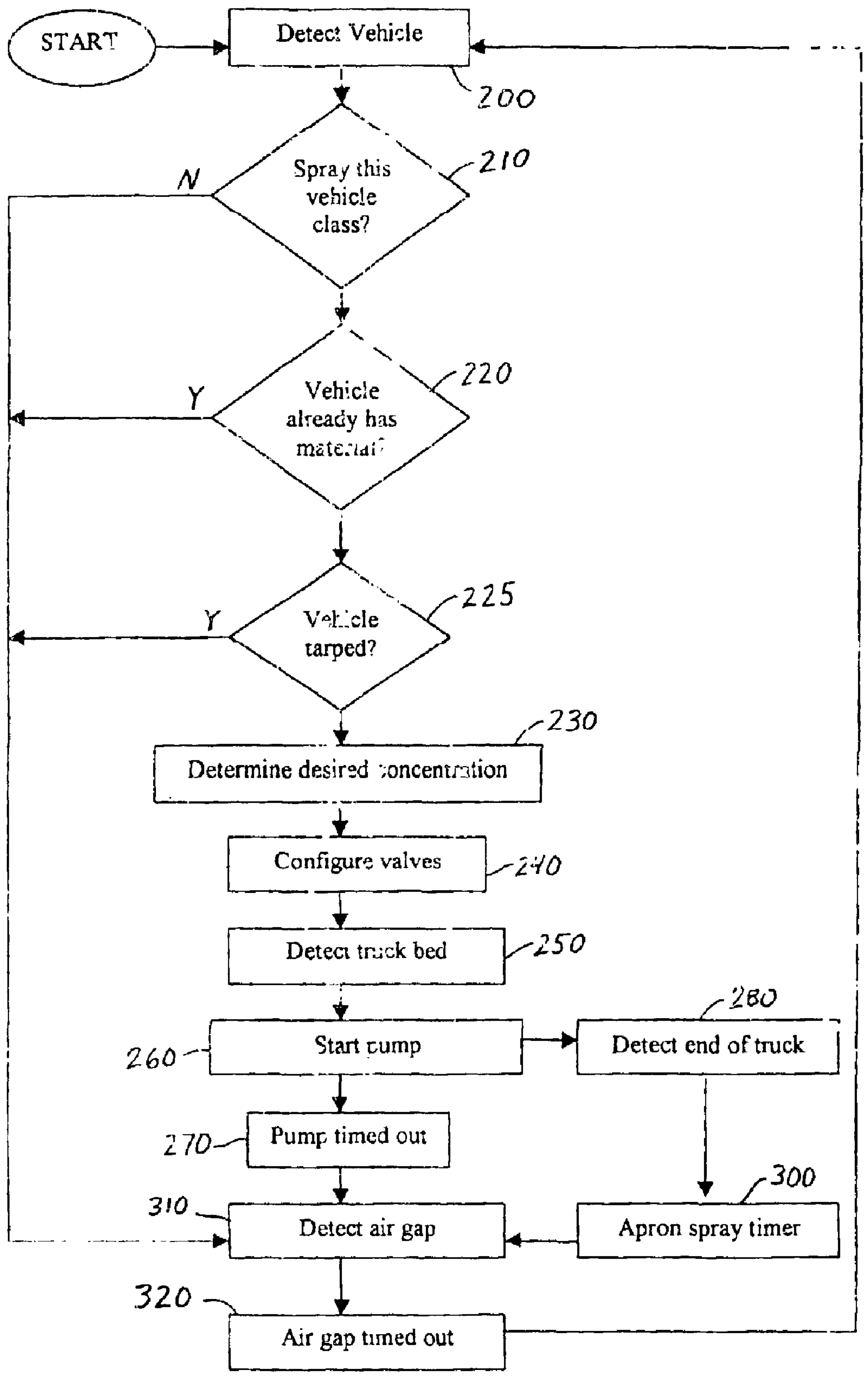
FIG. 3 is a logic flow diagram of a control method for an automatic fluid application system according to one embodiment of the present invention.

Referring now to FIG. 3 there is shown a logic flow diagram of a method of controlling the automatic fluid application system according to one embodiment of the present invention. The method of FIG. 3 will be described with reference to the system components shown in FIGS. 1 and 2. The logic resides in the controller and is executed for each vehicle passing through the automatic fluid application system.

Although the logic routine is described with reference to FIGS. 1 and 2, it should be understood that it can also be used to advantage more simple spray systems which lack one or more of the components of FIGS. 1 and 2 such, for example, inputs 65, 90.

The logic begins in block 200 wherein the system detects at least the presence of a vehicle under the spray boom. This is accomplished in any of numerous ways. The vehicle may be detected by receiving inputs from sensors 18. It can also be done with sensor 56, input into panel 17, activation of input device 65, a signal from scale 70, or a signal from communications link 90. The vehicle detection criteria are preferably satisfied for a predetermined period of time before a vehicle detection is declared.

In response to a vehicle detection, the vehicle is classified in block 210 to determine whether it is of the type of vehicle desired for spraying. The foregoing vehicle detection inputs and sensors are used to classify the vehicle. For example, the type of vehicle may be determined from sensor 56 which may be, for example, an ultrasonic sensor capable of profiling the contour of the top and bed of vehicle 50. As mentioned above, one or more of sensors 18, 56 may also be radio tag readers or bar code systems capable of detecting the presence of and type of vehicle passing through the system. Alternatively, communications link 90 may receive the vehicle type/profile data from other systems at the asphalt plant wherein vehicle data/type information is collected. In one example, detected vehicles are classified broadly as trucks or non-trucks. If a vehicle is a truck, it is further classified as a tractor trailer or non-tractor trailer. With sensor 18, this is accomplished by positioning of the beam sensors and a break/timing profile. Distance sensor 56 can be used to classify vehicles by profile signature. Operator panel 17 can be used to classify vehicles as a result of operator input. Input 65 can be used to classify vehicles by detecting encoded data within the tag id, bar code, etc., or by way of a lookup table indexed by users. A weight profile from scale 70 can also be used to classify vehicles as well as communications link 90.

The vehicle classification can be used to configure the spray unit for the particular type of vehicle as well as set the pump timer (block 270). That is, the information regarding the length, width, height, etc. of the vehicle can be used to more accurately spray the material container.

In block 220, it is determined whether the truck already has material loaded. Again, depending upon the sensor set and/or input configuration of the spray system, this can be accomplished in several ways. Operator panel 17 can be manipulated by the user to alert the system that the truck already has material. Sensor 56 can be used to determine if the truck has material by analyzing the signal profile from the sensor. The scale 70 can indicate a loaded condition when a certain weight range is exceeded. Input device 65 can also indicate a loaded condition by receiving information from a secondary id tag, card or bar code to indicate that the truck has already been loaded. Similarly, communications link 90 can also receive an indication from other control systems indicating whether the truck is loaded. This control feature can be beneficial to prevent spraying of vehicle truck beds which already have material loaded into them which may be in the station for other purposes such as for using the scale 70.

In block 225, it is determined whether the truck is tarped. The tarped condition can be determined in any of numerous ways including all of those just described with respect to block 220 in determining whether a vehicle is loaded. The difference between determining whether a vehicle is loaded or tarped is a function of the signature profile received from the sensor arrangement. A tarped vehicle will often exhibit a different "signature" than a loaded vehicle. These signatures can be further enhanced through filtering and slope characteristics of the sensor data. If the vehicle is tarped, it is not sprayed and as well, the operator may be alerted.

In blocks 230 and 240, the system determines the desired dilution ratio of the release agent to be applied to the detected vehicle and configures the spray system to deliver the desired concentration of release agent. As mentioned above, the concentrated release agent 14 is drawn into the pump 12 through a programmable two-way valve 30 designed to vary the flow rate of the release agent into the pump between two preset values. In this way, the valve 30 can control the ratio of water to release agent from, for example, 15:1 in response to one control signal and 5:1 in response to a second control signal. In block 240, the controller activates the valve 30 to provide the desired flow rate of release agent to achieve the desired concentration ratio depending upon the identity of the vehicle, type of vehicle, and type of asphalt being transported. This information is either gathered from the sensor data in block 210, or input by the vehicle operator or asphalt plant personnel into the controller 16 by way of an operator input device 17. Alternatively, this information is gathered from other systems at the asphalt plant by way of communications link 90. Of course, although a two-way valve capable of only two different flow rates is disclosed in the present example, any variable valve responsive to a control signal can be used. A manually selectable valve can also be used to set the dilution ratio to a predetermined ratio.

Communications link 90 can also be used to set the desired concentration ratio by detecting which silo is the next to dispense into the vehicle to be sprayed. The next active silo can be detected from an indicator light, a safety gate condition, or a selection switch. A lookup table indexed by silo can then be used to indicate the desired release agent concentration. In some installations, it may be possible to directly detect the material about to be dispensed.

In block 250, the truck bed 60 is detected by one or more of the sensors 18, 56, 70 or inputs 17, 65, or communications link 90. A timing routine can also approximate the start of the truck bed using the signal lights 80 as a guide. One method of detecting the vehicle bed is by monitoring the output of sensor 56 which is designed to detect the distance to the detected vehicle. The sensor 56 looks for the desired vehicle feature, i.e., the bed or material container portion, as the vehicle passes under the spray unit 34. Sensor profile will indicate the vehicle hood and the vehicle cab, both of which will be indicated as being relatively close to the sensor. The vehicle bed, on the other hand, is typically in the range of approximately 4 and 5.5 feet above ground level. Thus, if the truck pulls forward through the system, the sensor 56 will detect a sudden significant change in distance represented by the floor 60 of the vehicle truck bed and signal to the controller that the truck bed has been detected. This represents the first or front end of the material container portion of the truck. Sensor 56 can also be used in combination with sensor 18. The light-based sensor 18 can be set to detect the height of approximately 5.8 feet above ground level. In such cases, when the sensor 18 detects the presence of a vehicle feature of 5.8 feet high, which is most likely the sides of a vehicle bed, and the sensor 56 detects the vehicle feature of between approximately 4 and 5.5 feet above ground level which is most likely the floor of a vehicle bed (i.e., the material container portion of the vehicle), the vehicle bed detection condition is satisfied.

In block 260, the pump 12 is activated by the controller 16 to deliver the release agent mixture to the spray unit 34 and onto the vehicle truck bed. The pump is activated as a function time and/or the type of vehicle or vehicle profile.

In block 270, it is determined whether the pump has timed out. When the pump is started in block 260, a maximum time allowed for the pump is set. This can be a function of the vehicle type as determined in block 210. This timer is a function of the truck identification and/or the truck classification. Some particular trucks require more spray time than others, and as well, semi-tractor trailers require more spray time than short box, dump truck type vehicles. At the end of the pump timer, the pump is turned off. The pump is also turned off is the end of the truck bed is detected in block 280.

In block 300, a truck apron timer is activated until it times out. This is set as a function of the vehicle being sprayed.

Some vehicles include an apron or pan located rearward of the truck bed. It may be desirable to spray this portion of the vehicle as well. Thus, the spray unit continues application for the duration of the apron timer, when set, despite detection of the end of the truck bed in block 280.

In block 310 and 320, the timers and system are reset in preparation for the next vehicle. In one embodiment, the system does not reset until the light-path of the sensors 18 is broken (block 310) continuously for one to six seconds (block 320). This is to prevent the improper activation of the system upon the detection of a brief sensor interrupt. Another example of the reset routine may include closing the valve 30 after a vehicle has passed through the system and activation of the pump for a brief period to clear the spray unit and nozzles with water only. The system reset may also include setting a delay to prevent the immediate reactivation of the spray unit (block 320). This can be beneficial when it is necessary to replenish the water supply upon detecting that the fluid level in reservoir 25 is too low to spray the next vehicle. A similar low-agent sensor indication can be used to prevent system activation until reservoir 14 is replenished.

The system can also include the ability to purge liquid from the spray system and all associated pumps, valves, and conduit. Compressed air can be circulated through the system as part of a shut-down routine or with a purge activation. The ability to purge the system can be beneficial in cold weather climates to prevent line freeze or fluid circulation problems.

From the foregoing, it will be seen that there has been brought to the art a new and improved automatic fluid application system which has advantages over prior fluid application systems. While the invention has been described in connection with one or more embodiments, it will be understood that the invention is not limited to those embodiments. For example, two vehicles could be serviced simultaneously with the addition of another control valve and a second or elongated boom structure supporting corresponding additional sensors and nozzles. Accordingly, the invention covers all alternatives, modifications, and equivalents as may be included within the spirit and scope of the appended claims.

What is claimed is:

1. A fluid application system for a vehicle having a material container portion, the system comprising:

- a fluid source;
- a pump in fluid communication with said fluid source;
- a spray unit including a nozzle in fluid communication with said pump;
- a sensor adapted to output a vehicle detection signal including a vehicle profile signal; and
- a controller in operative communication with said sensor and said pump, said controller adapted to receive said vehicle detection signal, activate said pump to deliver said fluid to said spray unit in response to said vehicle profile signal indicating a first end of said material container portion.

2. A fluid application system according to claim 1 wherein said controller is further adapted to deactivate said pump in response to said vehicle profile signal indicating a second end of said material container portion.

3. A fluid application system according to claim 1 wherein said controller is adapted to activate said pump for a predetermined period of time.

4. A fluid application system according to claim 1 wherein said sensor is a distance-based sensor comprising at least one of an ultrasound, proximity, or laser sensor.

5. A fluid application system according to claim 1 wherein said sensor is a light-based sensor.

6. A fluid application system according to claim 1 wherein said sensor is a scale.

7. A fluid application system according to claim 1 wherein said fluid source comprises first and second fluid sources in fluid communication with said pump, said pump being adapted to communicate a configurable mixture of said first and second fluid sources to said spray unit.

8. A fluid application system according to claim 1 further comprising an input device for providing a vehicle identification signal to said controller, and wherein said controller is adapted to determine whether to spray a detected vehicle in response to said vehicle identification signal.

9. A fluid application system according to claim 8 wherein said input device comprises at least one of a bar code reader, a radio tag reader, an operator input device, or a credit card-type reader.

10. A fluid application system according to claim 7 further comprising an input device for providing a vehicle identification signal to said controller, and wherein said controller is adapted to determine a ratio of said first and second fluid sources for said mixture in response to said vehicle identification signal.

11. A fluid application system according to claim 7 comprising a selectable valve between said first fluid source and said pump, said valve responsive to a valve control signal for modifying a flow rate of said first fluid source to said pump.

12. A fluid application system according to claim 11 wherein said controller is adapted to output said valve control signal in response to said vehicle identification signal.

13. In a fluid application system comprising a controller, pump and spray unit, a method for applying a fluid mixture to a material container portion of a vehicle, the method comprising:

- receiving a vehicle detection signal from a first sensor indicating a vehicle proximate the spray unit;
- processing a vehicle profile signal from said first sensor to locate a first end of said material container portion with respect to said spray unit; and
- activating said pump to deliver said fluid to said spray unit in response to locating said first end of said material container.

14. A method according to claim 13 further comprising processing said vehicle profile signal to locate a second end of said material container portion with respect to said spray unit, and deactivating said pump in response to locating said second end of said material container portion.

15. A method according to claim 13 wherein said controller is adapted to activate said pump for a predetermined period of time.

16. A method according to claim 13 comprising receiving a vehicle identification signal indicative of a type of vehicle class.

17. A method according to claim 16 wherein receiving a vehicle identification signal comprises generating vehicle identification information from at least one of a bar code reader, radio tag reader, credit card-type reader, or operator input.

18. A method according to claim 13 comprising determining whether said vehicle material container portion is covered or already contains material and, in response, preventing activation of said pump.

19. A method according to claim 14 wherein deactivating includes deactivating said pump for a predetermined period of time.

20. A method according to claim 13 comprising receiving a material characteristic corresponding to said detected vehicle and, in response to said material characteristic, providing a fluid mixture ratio to said spray unit as a function of said material characteristic.

21. A method according to claim 20 wherein receiving a material characteristic comprises generating material characteristic information from at least one of a bar code reader, radio tag reader, credit card-type reader, operator input, or communications link.

22. A method according to claim 20 wherein providing comprises setting a control valve to a selectable position to provide a predetermined fluid mixture ratio to said spray unit.

23. In a fluid application system comprising a controller, pump and spray unit, a method for applying a fluid mixture to a vehicle having a material container portion comprising:

receiving a vehicle detection signal from a first sensor indicating a vehicle proximate the spray unit;

receiving a vehicle identification signal indicative of a corresponding fluid mixture ratio to be applied to said material container;

processing a vehicle profile signal from said first sensor to locate a first end of said material container portion with respect to said spray unit;

setting a control valve in communication with a fluid source to provide said corresponding fluid mixture ratio; and activating said pump to deliver said corresponding fluid mixture to said spray unit in response to locating said first end of said material container.

24. A method according to claim 23 further comprising processing said vehicle profile signal to locate a second end of said material container portion with respect to said spray unit, and deactivating said pump in response to locating said second end of said material container portion.

25. A method according to claim 23 comprising determining whether said vehicle material container portion is covered or already contains material and, in response, preventing activation of said pump.

* * * * *